United States Patent
Khaykin et al.

(10) Patent No.: US 6,976,569 B2
(45) Date of Patent: Dec. 20, 2005

(54) PULSE WIDTH MODULATION OF BRAKE SHIFT INTERLOCK SOLENOID

(75) Inventors: Boris L Khaykin, West Bloomfield, MI (US); Carrie Porter, Ferndale, MI (US); Dave John Rutkowski, Grosse Ile, MI (US); Keri Przebienda, Northville, MI (US); Thomas Dudley Belanger, Jr., Saline, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 214 days.

(21) Appl. No.: 10/407,393

(22) Filed: Apr. 4, 2003

(65) Prior Publication Data

US 2004/0195071 A1 Oct. 7, 2004

(51) Int. Cl.[7] .......................... B60K 41/28; B60K 41/26
(52) U.S. Cl. ............................. 192/220.4; 192/220.2; 477/96
(58) Field of Search .................... 192/220.2, 220.4, 192/220.5, 220.6, 220.7; 477/96; 701/53; 361/143, 144, 194

(56) References Cited

U.S. PATENT DOCUMENTS

| | | | |
|---|---|---|---|
| 4,629,043 A | 12/1986 | Matsuo et al. | |
| 4,771,657 A | 9/1988 | Iwatsuki | |
| 4,892,014 A | 1/1990 | Morell et al. | |
| 4,998,177 A | * 3/1991 | Takizawa et al. | 361/194 |
| 5,027,931 A | * 7/1991 | Ratke et al. | 192/220.2 |
| 5,096,033 A | 3/1992 | Osborn | |
| 5,107,391 A | * 4/1992 | Siepmann | 361/194 |
| 5,167,308 A | 12/1992 | Osborn | |
| 5,289,740 A | 3/1994 | Milunas et al. | |
| 5,645,097 A | 7/1997 | Zechmann et al. | |
| 5,696,679 A | 12/1997 | Marshall et al. | |
| 5,703,748 A | 12/1997 | Fulks et al. | |
| 5,818,678 A | 10/1998 | Berg et al. | |
| 5,853,348 A | * 12/1998 | Lehman | 477/96 |
| 6,019,441 A | 2/2000 | Lloyd et al. | |
| 6,061,224 A | * 5/2000 | Allen | 361/194 |
| 6,128,175 A | 10/2000 | Wright et al. | |
| 6,139,468 A | 10/2000 | Goates et al. | |
| 6,293,363 B1 | 9/2001 | Rangaswamy et al. | |
| 2004/0031660 A1 | * 2/2004 | Kliemannel | 192/220.4 |
| 2004/0043865 A1 | * 3/2004 | Avers et al. | 477/96 |

FOREIGN PATENT DOCUMENTS

JP 7-42830 A * 2/1995
WO WO 03/002895 A1 * 1/2003

* cited by examiner

Primary Examiner—Rodney H. Bonck
(74) Attorney, Agent, or Firm—Brinks Hofer Gilson & Lione

(57) ABSTRACT

An apparatus and method is provided for an improved brake shift interlock system which reduces solenoid noise created by vehicle vibrations and solenoid activation. The brake shift interlock system includes a park position switch, a brake sensor, and a control circuit. The method includes the sensing of the park position switch and the brake sensor and generating a pulse width modulated control signal having a varying duty cycle for driving the solenoid when predetermined conditions of the park position switch and brake sensor are sensed.

16 Claims, 2 Drawing Sheets

PULSE WIDTH MODULATION OF BRAKE SHIFT INTERLOCK SOLENOID

FIELD OF THE INVENTION

The present invention relates in general to a brake shift interlock for a transmission shift lever and more specifically to a brake shift interlock in combination with an ignition interlock.

BACKGROUND OF THE INVENTION

Many of the present day automotive vehicles having automatic transmissions use electronically controlled mechanisms to establish the operating condition of the transmission. These control systems typically include solenoids, switches, and electronic circuitry.

For reasons of safety and government regulation, it is required that these automatic transmissions incorporate transmission shift-lock capability wherein the transmission shift lever and the ignition switch have limited movement unless certain conditions are met. In accordance with the shift-lock function, when starting the vehicle, the transmission shift lever can be moved out of the park position only if the driver presses on the brake pedal and if the ignition key is turned so as to be in the run position. Various systems have been proposed and utilized to achieve a combined brake shift interlock and ignition switch interlock function wherein a solenoid is engaged to prevent movement of the transmission shift lever. Most of these prior art systems have proved to function as intended but at the expense of introducing unwanted noise into the brake shift interlock system which can be heard by a vehicle's operator. The noise created typically originates from a couple of sources. Specifically, a source of noise is the vibration of the engine which causes the plunger within the solenoid housing to vibrate. A second source of noise results from the sudden movement of the solenoid, which causes the solenoid to contact the end stops when energized and de-energized.

It would be desirable, therefore, to provide a brake shift interlock system, which reduce the noise created by plunger vibration and noise created by contact with the end stops in addition to meeting governmental and vehicle manufacturer system requirements.

SUMMARY OF THE INVENTION

The present invention overcomes the disadvantages of the prior art approaches by providing a brake shift interlock system and method of operation which maintains the plunger solenoid in a stationary position. The brake shift interlock system has a transmission shift lever and a brake pedal. The system comprises a battery and a solenoid which is movable between a first and second position and provides a mechanical stop for the transmission shift lever while in a first position. A switch is included that is coupled to the solenoid for controlling current flow through the solenoid.

The present invention provides a control circuit for energizing the switch in response to sensing the position of the transmission shift lever and the brake pedal. The control circuit is capable of generating a pulse width modulated signal which has a varying duty cycle for controlling the solenoid switch. The duty cycle of the pulse width modulated signal is ramped up when the solenoid is moving between the first and second position.

It is also an object of this invention to provide a method of operation for the brake shift interlock system wherein the solenoid is energized by applying a pulse width modulated electric current to the switch resulting in the solenoid being moved from the first position to the second position. The solenoid is energized if the brake pedal sensor senses the brake pedal in a predetermined brake position and the transmission shift lever in a predetermined shift position. The solenoid is energized such that the solenoid will remain in the second position wherein the duty cycle ramps down to a predetermined "hold" duty cycle when the transmission shift lever moves out of the predetermined shift position and the brake pedal is released from the predetermined brake position. In addition, the method further includes the step of sensing and measuring the current in the solenoid and compensating the pulse width modulation signal when there is variation in the battery voltage and the resistance of the solenoid.

These and other advantages, features and objects of the present invention will become apparent from the drawings, detailed description and claims which follow.

DETAILED DESCRIPTION OF PREFERRED EMBODIMENTS

Figure 1:
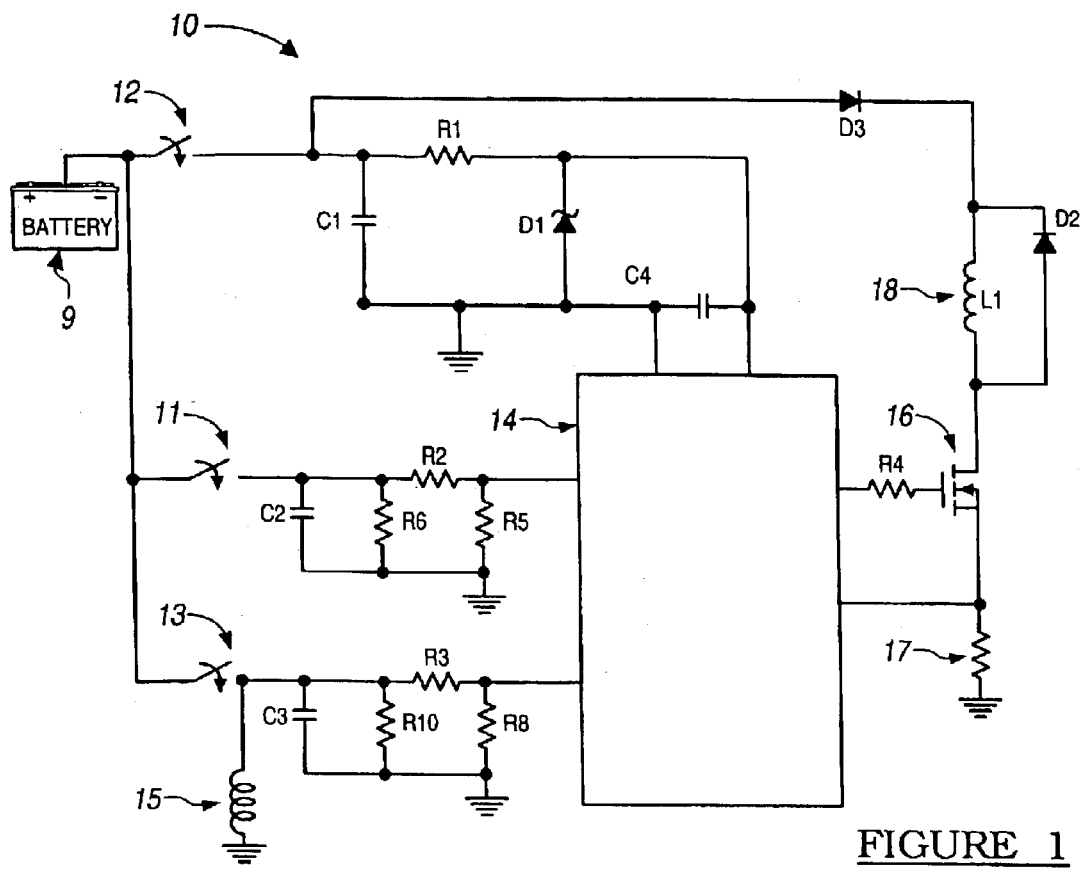
FIG. 1 is a schematic diagram of a brake shift interlock system according to the present invention.

Referring now to the drawings, FIG. 1 shows a schematic diagram of a brake shift interlock system 10 according to the present invention. The brake shift interlock system 10 includes an ignition switch 12 which is connected to a battery 9 and the ignition switch 12. The ignition switch 12 is moveable between an on and off position thereby allowing the flow of electric current when in an on position. A park position switch 13 is coupled to the power source. The park position switch 13 changes positions in response to the position of a transmission shift lever (not shown). In a preferred embodiment, the transmission shift lever is in a predetermined shift position when in a full-park position. A full-park position occurs when the transmission shift lever is securely positioned in PARK completely at the end of motion within the PARK range. Hereinafter, the term full-park position shall also be referred to as PARK. A non-PARK position occurs when the transmission shift lever is in any position other than the PARK position. Preferably, the park position switch 13 is in a closed state when the transmission shift lever is in the non-PARK position. The park position switch 13 is in an open position when the transmission shift lever is in the PARK position. The park position switch 13 is also used to control an external ignition keylock solenoid 15. The ignition keylock solenoid 15 is energized when the transmission shift lever is in the non-PARK position to prevent removal of a vehicle's ignition key and is de-energized to allow removal of the ignition key when in the PARK position.

A brake sensor 11 senses whether or not a vehicle brake pedal (not shown) is in a predetermined pedal position. In one embodiment the brake sensor 11 is an electrical switch. The predetermined brake position occurs when the brake pedal is in a depressed position.

A controller 14 is coupled to the ignition switch 12, brake sensor 11, and the park position switch 13 through biasing circuitry well known to one skilled in the art. A switch 16 is also connected to the controller 14. The controller 14 generates signals for controlling the switch 16. In the preferred embodiment, the controller 14 is capable of generating pulse width modulated (hereinafter referred to as PWM) signals and the switch 16 is a metal oxide semiconductor field effect transistor (MOSFET).

The battery 9 has a nominal battery voltage. Preferably, the nominal battery voltage is twelve volts. The solenoid 18 has a nominal solenoid resistance, which is twenty-two ohms in the preferred embodiment. Due to factors such as the environment and the vehicle's power demand, the voltage of the battery 9 may fluctuate from nine volts up to sixteen volts and the resistance of the solenoid 18 may fluctuate plus or minus twenty-five percent from the nominal solenoid resistance. A resistor 17 senses the current applied to the solenoid 18 and the controller 14 measures the current through the resistor 17. The controller 14 also monitors the voltage of the battery 9. The sensing and measuring of the current through resistor 17 and monitoring of the battery 9 allow the brake shift interlock system 10 to compensate the PWM signal by adjusting the duty cycle when the battery voltage is not equal to the nominal battery voltage or when the resistance of the solenoid 18 is not equal to the nominal solenoid resistance.

When the ignition switch 12, the brake sensor 11, and the park position switch 13 are all activated, the controller 14 generates a PWM drive signal for the MOSFET 16 that ramps up to a duty cycle of 100%. The ramping of the duty cycle causes the solenoid 18 to move from a first position to a second position. In the preferred embodiment, the first position of the solenoid 18 is when the plunger (not shown) within the solenoid 18 is in an extended position for retaining the transmission shift lever in the PARK position. The second position of the solenoid 18 occurs when the plunger within the solenoid 18 is in a retracted position thereby allowing the shift lever to be moved out of the PARK position. Once the duty cycle reaches 100% and the solenoid reaches the second position, the duty cycle of the MOSFET 16 drops to a predetermined duty cycle for holding the solenoid 18 at the second position (e.g., a duty cycle of about 25%). The predetermined duty cycle may vary depending on the design of solenoid 18. The energization and reduction in duty cycle of the solenoid 18 through MOSFET 16 results in the plunger of solenoid 18 being held stationary within the housing of solenoid 18 at the second position. In addition, the ramp time (i.e., ramping rate) of the duty cycle is chosen to move the solenoid 18 gradually between positions thereby minimizing vibration of the plunger and actuation noise.

Figure 2:
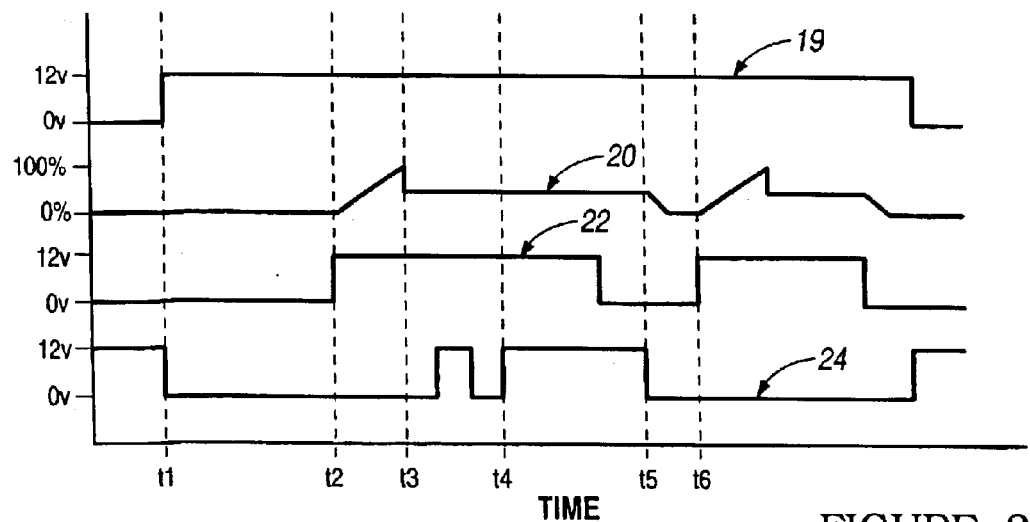
FIG. 2 illustrates example signals generated by the present invention.

Referring to FIG. 2, trace 19 represents the voltage versus time of the ignition switch 12, trace 20 represents the duty cycle of the drive signal applied to MOSFET 16, trace 22 represents the voltage versus time of the brake sensor 11, and trace 24 represents the voltage versus time of the park position switch 13. If the transmission shift lever is moved from the non-PARK position to PARK, while the brake sensor 11 senses a depressed brake pedal, the controller 14 continues to generate a PWM signal for the MOSFET 16 which results in holding the solenoid 18 at the second position. While the transmission shift lever is in the PARK position, the controller 14 generates a drive signal to drive the MOSFET 16 each time the brake pedal is pressed by the vehicle operator and the duty cycle of the solenoid 18 ramps up to a maximum duty cycle. Preferably, the maximum duty cycle is at 100%. Once a 100% duty cycle is obtained and the solenoid has reached the second position, the duty cycle reduces to a predetermined "hold" duty cycle. In sequence, as shown in FIG. 2, at a time t1, the ignition switch 12 is turned on and the transmission shift lever is placed in the PARK position. At a time t2, the brake sensor 11 senses the brake pedal in a depressed position and the duty cycle of the solenoid 18 ramps up to the maximum duty cycle. At a time t3, the duty cycle of the solenoid 18 drops down to the predetermined "hold" duty cycle (e.g., a duty cycle of about 25%). At a time t4, the solenoid remains at the predetermined "hold" duty cycle as the transmission shift lever is moved out of the PARK position and if the brake pedal is not in a depressed position. At a time t5, the duty cycle of the solenoid 18 ramps down as the brake pedal is not in a depressed position and the transmission shift lever is placed back in the PARK position. At a time t6, the duty cycle of the solenoid 18, begins to ramp up as the brake pedal is placed in the depressed position as the transmission shift lever is in the PARK position.

As can be seen by comparing traces 20, 22, and 24, according to this invention, the duty cycle of the MOSFET 16 will remain at the predetermined duty cycle after the transmission shift lever is placed in the non-PARK position, regardless of the state of the brake sensor 11.

Figure 3:
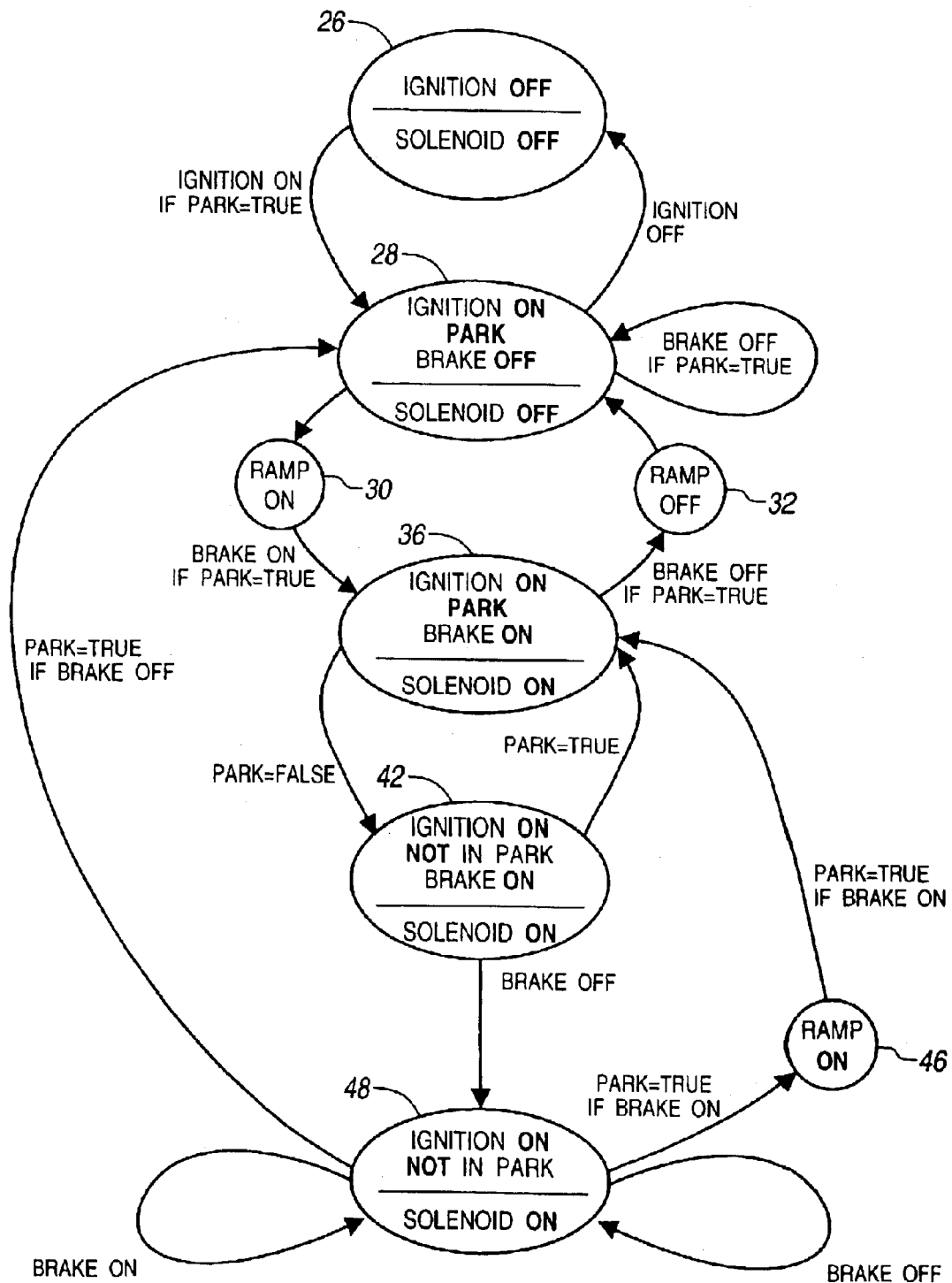
FIG. 3 is a state diagram showing various states of the present invention when specific conditions occur.

The method of the brake shift interlock system 10 is shown in greater detail in FIG. 3. A state 26 occurs when the vehicle operator positions the ignition switch in the off position which results in the shift solenoid being de-energized. When the solenoid is de-energized the solenoid is in an extended position. A state 28 occurs when the ignition switch is in the on position, the transmission shift lever is in the PARK position, and the brake sensor does not sense the brake pedal in a depressed position. A state 30 occurs when the brake pedal is in a depressed position and the transmission shift lever is in the PARK position. At the state 30 the solenoid is ramped up to the maximum duty cycle wherein the solenoid begins to move from the first position to the second position. Once the maximum duty cycle is reached, the duty cycle will decrease to the predetermined "hold" duty cycle. Depending on system design, the drop in duty cycle may be either instantaneous or gradual. A state 36 occurs when the ignition switch is in the on position, the transmission shift lever is in PARK, and the brake pedal is in the depressed position. At the step 36, the solenoid is fully in the second position. A state 32 occur when the vehicle operator releases the brake pedal. At the state 32, the solenoid is ramped down from the predetermined "hold" duty cycle to a duty cycle of 0%. A state 42 occurs when the ignition switch is in the on position, the transmission shift lever is in a non-PARK position, and the brake pedal is in the depressed position. At the state 42, the solenoid is energized and consequently in the retracted position. A state 44 occurs subsequent to the step 42 when the brake pedal is released into a non-depressed position. A step 48 occurs when the ignition switch is in the on position and the transmission shift lever is not in the PARK position. When in the state 48, changes in the brake signal do not result in a state change. A state 46 occurs subsequent to the state 48 occurring, wherein the solenoid duty cycle is ramped up to the maximum duty cycle of 100% and then reduced to the predetermined "hold" duty cycle of 25% in response to the brake pedal in the depressed position and the transmission shift lever in the PARK position.

Various other modifications to the present invention may occur to those skilled in the art to which the present invention pertains. Other modifications not explicitly mentioned herein are also possible and within the scope of the present invention. It is the following claims, including all equivalents, which define the scope of the present invention.

What is claimed is:

1. A brake shift interlock system for a vehicle having a transmission shift lever sensor and a brake sensor comprising:
   a solenoid movable between a first and second position which provides a mechanical stop for the transmission shift lever while said solenoid is in the first position;
   a switch coupled to said solenoid for controlling current flow through said solenoid;
   a control circuit for energizing said switch in response to sensing the position of the transmission shift lever and brake pedal, said control circuit is for generating a pulse width modulated signal having a varying duty cycle for said solenoid and ramping the duty cycle when said solenoid is moving between said first and second positions.

2. A brake shift interlock system according to claim 1, wherein the first position of the solenoid is when the solenoid is in an extended position.

3. A brake shift interlock system according to claim 1, wherein the second position of the solenoid is when the solenoid is in a retracted position.

4. A brake shift interlock system according to claim 1, wherein said control circuit has a microprocessor for determining a duty cycle at which to energize said switch; in response to a solenoid current signal from said solenoid, the position of the brake pedal, and the transmission shift lever.

5. A brake shift interlock system according to claim 1, wherein the switch is a field effect transistor.

6. A brake shift interlock system for a vehicle having a transmission shift lever and a brake sensor comprising:
   an ignition switch movable between an on and off position;
   a solenoid movable between a first and second position which provides a mechanical stop for the transmission shift lever while said solenoid is in the first position;
   a switch coupled to said solenoid for controlling current flow through said solenoid;
   a control circuit for energizing said switch in response to sensing the position of the transmission shift lever and brake pedal, said control signal having a microprocessor for generating a pulse width modulated signal having a varying duty cycle for said solenoid and ramping the duty cycle when said solenoid is moving between said first and second position.

7. A method of operation for a brake shift interlock system having a transmission shift lever, a battery, a brake pedal sensor, and a solenoid which provides a mechanical stop for the transmission shift lever wherein the solenoid is movable between a first position to a second position, comprising the steps:
   energizing a solenoid resulting in the solenoid being moved from the first position to the second position by applying a pulse width modulated electric current to said solenoid if the brake pedal sensor senses the brake pedal in a predetermined brake position and the transmission shift lever in a predetermined shift position; and
   energizing the solenoid to remain in a second position wherein the duty cycle ramps down to a predetermined hold duty cycle when the transmission shift lever moves out of the predetermined shift position and the brake pedal is released from the predetermined brake position.

8. A method according to claim 7, wherein the predetermined shift position of the transmission shift lever is a full-park position.

9. A method according to claim 7, wherein the predetermined brake position is a depressed position.

10. A method according to claim 7, further comprising the step of sensing a current in the solenoid.

11. A method according to claim 10, further comprising the step of compensating the pulse width modulated electric current applied to the solenoid when the battery voltage is not equal to a nominal battery voltage or the resistance of the solenoid is not equal to a nominal solenoid voltage.

12. A method of operation for a brake shift interlock system having a battery, a transmission shift lever, a brake pedal sensor, and a solenoid which provides a mechanical stop for the transmission shift lever wherein the solenoid is movable from a first position to a second position, comprising the steps:
   energizing a solenoid to a maximum duty cycle resulting in the solenoid being moved from the first position to the second position by applying a pulse width modulated electric current to said solenoid if the brake pedal sensor senses the brake pedal in a predetermined brake position and the transmission shift lever in a predetermined shift position; and
   energizing the solenoid to remain in a second position wherein the duty cycle ramps down to a predetermined hold duty cycle when the transmission shift lever moves out of the predetermined shift position and the brake pedal is released from the predetermined brake position.

13. A method according to claim 12, wherein the maximum duty cycle is 100%.

14. A method according to claim 12, wherein the predetermined hold duty cycle is 25%.

15. A method according to claim 12, further comprising the step of sensing a current in the solenoid.

16. A method according to claim 15, further comprising the step of compensating the pulse width modulated electric current applied to solenoid when the battery voltage is not equal to a nominal battery voltage or the resistance of the solenoid is not equal to a nominal solenoid voltage.

* * * * *